No. 823,620. PATENTED JUNE 19, 1906.
O. A. MYGATT.
ILLUMINATOR.
APPLICATION FILED MAY 20, 1904.

2 SHEETS—SHEET 1.

Witnesses
Chas. K. Davies
John A. Daly

Inventor
O. A. Mygatt
by W. A. Bartlett
Attorney

No. 823,620. PATENTED JUNE 19, 1906.
O. A. MYGATT.
ILLUMINATOR.
APPLICATION FILED MAY 20, 1904.
2 SHEETS—SHEET 2.
FIG. 6.
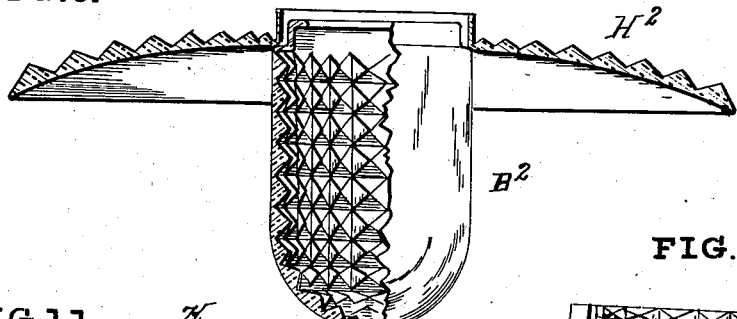
FIG. 13.
FIG. 11.
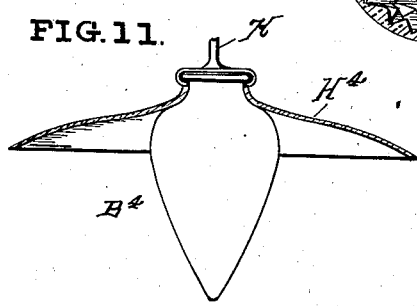
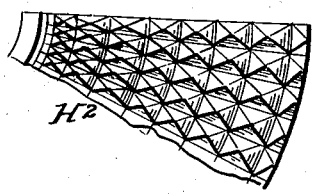

FIG. 9.
FIG. 12.
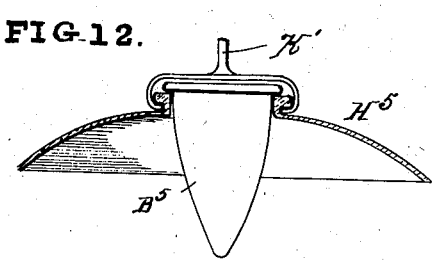
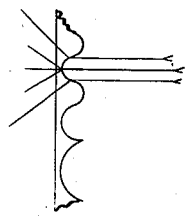

FIG. 7.
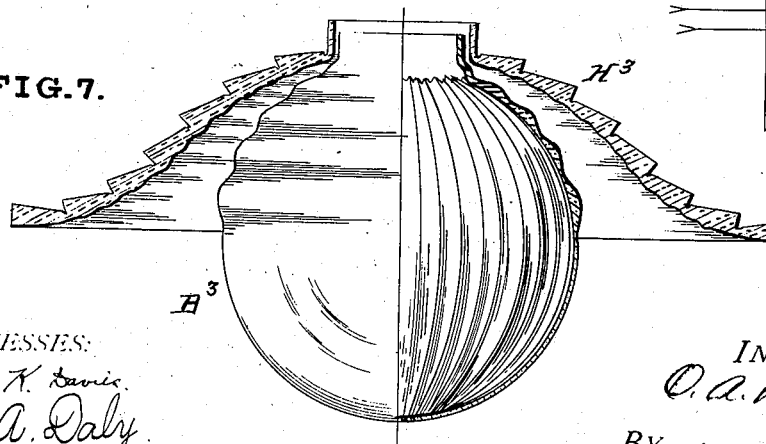
WITNESSES:
Chas. K. Davis
John A. Daly
INVENTOR
O. A. Mygatt
BY
Attorney

UNITED STATES PATENT OFFICE.

OTIS A. MYGATT, OF NEW YORK, N. Y.

ILLUMINATOR.

No. 823,620. Specification of Letters Patent. Patented June 19, 1906.

Application filed May 20, 1904. Serial No. 208,831.

*To all whom it may concern:*

Be it known that I, OTIS A. MYGATT, a citizen of the United States, residing at New York, in the county of New York and State of New York, have invented certain new and useful Improvements in Illuminators, of which the following is a specification.

This invention relates to prismatic illuminators or composite artificial lights, shades, and reflectors.

The object of the invention is to so combine with an artificial light (generally an incandescent electric or a glow lamp) a suitable diffusing shade, globe, or cover and a prismatic reflector as to give a good distribution of light accompanied with such diffusion as will render the light harmless or agreeable to the eye and to reduce to a minimum the disadvantages of prismatic-glass construction, due to the accumulation of dust on prismatic shades and reflectors and the difficulty of cleaning the same.

My invention consists in certain mechanical constructions whereby combinations may be effected and in the combination of the various parts, so that effective results may be obtained, substantially as hereinafter stated and claimed.

A simple embodiment of the present invention would be—

First, a common incandescent lamp.

Secondly, surrounding the lamp a diffusive cover or shade of glass having little if any opening for dust entrance. The interior of said cover or shade is substantially covered with light-diffusing ribs or prisms. The outside is preferably smooth.

Thirdly, a prismatic-glass reflector having reflecting-prisms on its upper surface, the lower surface being preferably smooth, arranged above said cover.

The same combination as that above described exists when a glow-lamp having an inclosing casing is substituted for the common incandescent electric lamp; but a non-inclosed arc-light would be a substantially different element in the combination.

Some modifications of this central idea are hereinafter described to show its wide range of adaptability.

Figure 1:
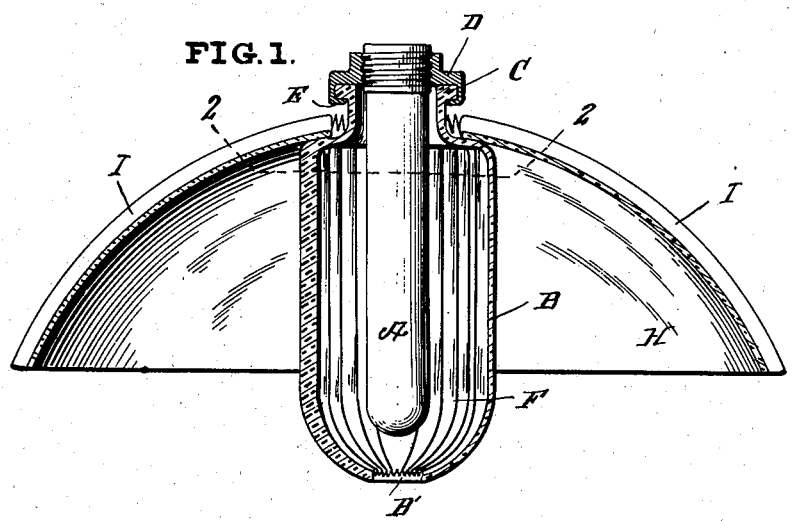
Figure 3:
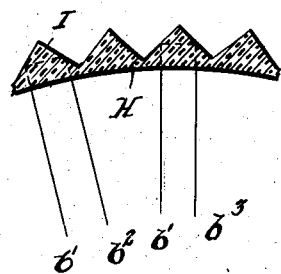
Figure 2:
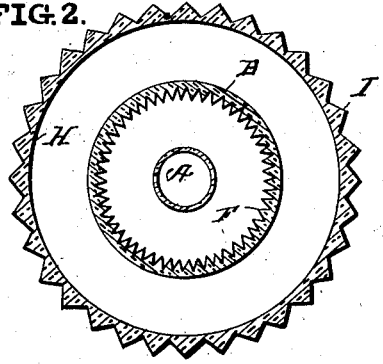
Figure 4:
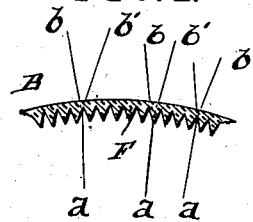
Figure 5:
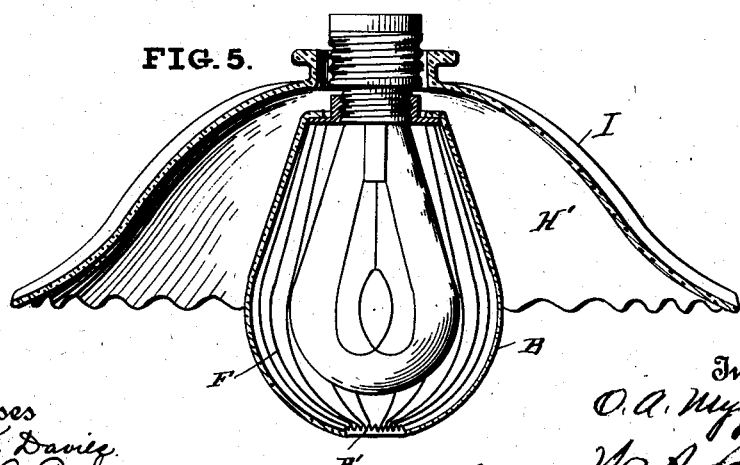
Figure 8:
Figure 10:
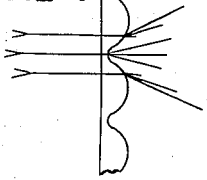

Figure 1 is a section of a reflector and lamp-cover as applied to a glow-light. Fig. 2 is a section of same on line 2 2. Fig. 3 is a broken section or diagram of reflector, showing course of some light-rays. Fig. 4 is a broken section of lamp shade or cover, showing course of some light-rays. Fig. 5 is an elevation of reflector and lamp-cover of different contour with a lamp-holder. Fig. 6 is a modification showing a prismatic reflector resting on the lamp shade or cover, the lamp being omitted for convenience. Fig. 7 is a partial elevation and partial section of a modification showing the inside of the shade covered with flutings. Fig. 8 is a partly broken section of a shade having prisms. Fig. 9 is a section of a fluted piece with light-rays passing in one direction and indicating light diffusion. Fig. 10 is a similar view with light-rays passing in a reverse direction. Fig. 11 is a section showing one form of support for reflector and shade; and Fig. 12 indicates another form, the diffusing-ribs and reflecting-prisms not appearing, owing to the small scale of the figures. Fig. 13 is a broken top plan of the reflector $H^2$, Fig. 6.

In my Design Patents Nos. 32,685 and 32,686, of May 22, 1900, I show and describe very efficient prismatic-glass reflectors. The present invention proposes to combine with such or an equivalent prismatic-glass reflector and with a lamp or light an intermediate lamp cover or shade which is little liable to accumulate dust on the outer surface and which has the property of diffusing or softening the light.

In order that my meaning may be fully understood, I will here define some of the terms I shall employ in this specification. By "light diffusion" I mean that light-rays from a lamp passing through a structure of glass are thereby broken up, softened, and sprayed out, with no particular regard to direction. By "distribution of light" I mean that light-rays, either by reflection or refraction, or both, are directed in a given and predetermined direction. In the present invention the distribution of light is effected by a prismatic reflector; the diffusion by a shade or cover. By a "prism" I mean a projection from the main body of the shade or reflector integral with said body and having at least two plane faces and one outer angle, but sometimes having more than two plane faces and more than one outer angle, as in the patent of Blondel, hereinafter referred to. By a "double-reflecting prism" I mean a prism in which many of the light-rays enter the glass from within, strike one of the outer faces of the prism at about forty-five degrees thereto, are reflected across the body of the prism at about ninety degrees from the first direction, encounter the second face at about forty-five degrees, and are again reflected to emerge from the reflector at the side of entry. (See Fig. 3.) By "vertical prisms" I mean such as extend in length outward and downward from the top or center, widening and thickening to retain the favorable angle. On a flat reflector these prisms are bounded by radial lines; on a spherical reflector by meridional lines. "Vertical" is only an approximate term. By "flutings" I mean such projections as have no extended plane faces, but merge in curves, as in Figs. 9 and 10. Such flutings may diffuse, but do not distribute, light. Flutings may be either vertical or circumferential.

The direction of light distribution by a prismatic reflector is determined not only by the form of the prisms, but by the form of the reflector-body on which the prisms are arranged. It will readily be understood that a reflector, curved as in Fig. 1, will direct the light reflected downwardly into a smaller circumference than would a comparatively flat reflector, as in Fig. 6.

The present invention is intended for use generally with the reflector above the light and its shade or cover. While the illuminator may be inclined to some extent, protection from dust is sacrificed in considerable degree if it is so inclined that the shade or cover projects beyond a perpendicular line from the edge of the reflector.

Patent to Synnott, No. 641,166, January 9, 1900, illustrates a globe with interior diffusing-ribs and outside "bull's-eyes." This is not a prismatic reflector, although it diffuses light.

Patent to Blondel et al., No. 563,836, July 14, 1896, describes a globe in one piece of high illuminating efficiency and providing both for diffusion and distribution of light; but this is likely to gather dust and when covered with dust loses its efficiency.

In my Patent No. 705,426, of July 26, 1902, I use a prismatic reflector in combination with a colored-glass structure interposed between the reflector and the lamp. This does not give such diffusion of light-rays as my present invention. There are no diffusing prisms, ribs, or flutings.

My present invention, in which a ribbed or light softening or diffusing diffusive shade or cover and prismatic reflector are combined, gives quite as efficient diffusion and distribution of light as does the Blondel device referred to and is nearly free from deterioration by accumulation of dust.

In Fig. 1, A represents a glow-lamp, a convenient form of electric light in a closed casing, to which my lamp cover and reflector may be applied. A shade or light softening or diffusing lamp-cover B is applied to this lamp A, so as to surround the same. This cover B is smooth externally and in the form shown in Fig. 1 has a generally cylindrical body. The lower end of this shade or cover is preferably open, as at B', to permit the entrance of air for cooling. A neck or collar C furnishes a support for the shade by means of metallic cap or ring D, attached to the lamp-socket and having hooks E, which turn in under the edge of the collar. The cover B is made of glass, preferably transparent. It is pressed in a mold to form vertical or longitudinal prisms F on the interior surface. The lower end of the cover is preferably drawn in after the article is pressed and while still plastic, as is common in forming glass articles. The outer surface is smooth, largely to prevent the adhesion of dust and to permit the passage of light-rays without obstruction and without much change of direction. The prisms F are preferably quite small, so that the thickness of cover B and its prisms may not be great. The function of prisms F is to split up and diffuse the light-rays passing through said shade or cover. Light-rays from lamp A, striking these prisms, generally at obtuse or acute angles, are broken up and divided. The lines $a\ b\ b'$, Fig. 4, indicate in a general way what takes place with some light-rays. Thus a light-ray $a$, striking at almost any part of the surface covered by prisms F, will pass through the glass, but will be broken up and divided as it emerges, the subdivided rays being more or less diverted from their original direction, according to the angle at which the rays encounter the plane faces of the prisms. Thus few rays can pass through the cover B without being divided or diverted, while very few rays will be reflected back toward the light by the prisms F. The upper part of the shade or cover B is closed by the support D, so there is little chance for the entry of dust into the interior of the shade B. As the prisms are substantially vertical, any dust entering at the open mouth or bottom B' will find little chance for lodgment.

The reflector H is of pressed glass, preferably transparent, and is smooth on the interior, and is externally covered with prisms I, preferably of a character which are adapted to produce the maximum reflection, as (in preferred form) double-reflecting prisms. $b'$ $b^2$ indicate light-rays as reflected. The sub-ray $b'$ is or may be similarly reflected by another prism in the direction $b^3$.

It has been found in practice that dust accumulating on the upper side of prismatic-glass reflectors of the character described has little or no effect on the reflected rays. A large accumulation of dust will of course prevent the transmission of light through the reflector, which light under normal conditions may amount to as much as fifteen to thirty per cent. of the light reaching the inner face of the reflector.

In Fig. 1 the reflector H is shown as resting on a shoulder of the shade or cover B. In Fig. 5 no means of supporting reflector is shown, as it is supposed to be supported in any usual or convenient manner.

In Fig. 6 the lamp shade or cover $B^2$ is represented as covered with internal-diffusion prismoids arranged in the form of diamonds, and the relatively flat reflector $H^2$ is covered on its upper surface with prismoids in the form of diamonds.

In Fig. 7 the shade or cover $B^3$ is represented as externally covered as to its upper part with circumferential flutings. While flutings will accumulate more dust than an actually smooth surface, the dust can be very easily removed from a fluted surface, which is not the case with a prismatic reflector. The reflector $H^3$ has its upper outer surface covered with prisms of the character described in my application, Serial No. 199,721, filed March 24, 1904.

Figs. 11 and 12 show different forms of construction of the shade or cover and reflector, so that as in Fig. 11 the parts may be assembled with the shade $B^4$ held by a metallic or other clasp K, and when so suspended said shade forms a support for the reflector $H^4$, or in Fig. 12 the reflector $H^5$ may be held by clasp K' and support a flange on the diffusing-cover $B^5$.

Instead of making the interior of the shade or cover quite smooth this may be fluted, as in Fig. 7, and in some cases the interior face of the reflector may be fluted, the flutings thus aiding in the diffusion of the light, but not in the distribution thereof.

The various forms of light-diffusing covers B B' $B^2$, &c., have been described as covered with internal surfaces, in some cases prisms, in others prismoids, in others flutings, in others ribs. The object of these various surfaces is the diffusion of light and not the reflection of light. For want of a better term I have used the word "ribs" in the claims as including the genus to which any of the described species may belong.

What I claim is—

1. The combination with an electric light surrounded by a closed glass casing, of a light-diffusing shade surrounding said glass casing, and a glass reflector surmounting said diffusing-shade, and having reflecting-prisms on its upper surface.

2. The combination with an electric light in a closed glass casing, of a light-diffusing shade having internal ribs and surrounding said casing, and a glass reflector surmounting said shade, and having reflecting-prisms on its upper surfaces.

3. The combination with an electric light in a closed glass casing, of a light-diffusing shade surrounding said casing at a little distance and having internal ribs and a partly-smooth exterior, and a glass reflector surmounting said shade and having external reflecting-prisms.

4. The combination with a closed electric lamp, of a surrounding light-diffusing shade having internal vertical ribs and being smooth on its outer lower portion, and a glass reflector resting on said shade and having external reflecting-prisms.

5. The combination with an electric light in a closed glass casing of a shade a little removed therefrom but of a generally similar form, and having internal diffusing-ribs and being smooth on the lower exterior part of its outer surface, and a glass reflector surmounting said shade, and having external reflecting-ribs and a smooth interior surface.

6. The combination with an electric light in a closed glass casing, of a glass shade, open at the bottom and closed at the top, surrounding said casing, and having internal light-diffusing bodies and a partly-smooth exterior, and a superposed reflector of glass having reflecting-prisms on its upper surface only.

In testimony whereof I affix my signature in presence of two witnesses.

OTIS A. MYGATT.

Witnesses:
THEOPHILUS PARSONS,
HOWARD TAYLOR.